(12) United States Patent
Isono et al.

(10) Patent No.: US 6,365,293 B1
(45) Date of Patent: Apr. 2, 2002

(54) FUEL CELL HAVING WATER PERMEABILITY ADJUSTMENT CAPABILITY

(75) Inventors: Takahiro Isono, Hirakata; Yasuo Miyake, Ora-gun; Akira Hamada, Ashikaga; Minoru Kaneko; Kunihiro Nakato, both of Ora-gun, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/599,198

(22) Filed: Jun. 22, 2000

(30) Foreign Application Priority Data

Jun. 22, 1999 (JP) .......................................... 11-176084
Apr. 21, 2000 (JP) .......................................... 12-121616

(51) Int. Cl.$^7$ ................................................. H01M 8/10
(52) U.S. Cl. ............................ 429/30; 429/12; 429/13; 429/30; 429/34; 429/38; 429/40
(58) Field of Search ............................ 429/12, 13, 34, 429/38, 40, 30

(56) References Cited

U.S. PATENT DOCUMENTS

| | | |
|---|---|---|
| 5,500,292 A * | 3/1996 | Muranaka et al. ............ 429/33 |
| 5,620,807 A | 4/1997 | Mussell et al. |
| 5,958,613 A | 9/1999 | Hamada et al. |
| 6,083,638 A | 7/2000 | Taniguchi et al. |

FOREIGN PATENT DOCUMENTS

| | | |
|---|---|---|
| JP | 9-283153 A | 10/1997 |
| JP | 11-154523 A | 6/1999 |

* cited by examiner

*Primary Examiner*—Carol Chaney
*Assistant Examiner*—Dah-Wei Yuan
(74) *Attorney, Agent, or Firm*—Merchant & Gould P.C.

(57) ABSTRACT

The object of the present invention is to provide fuel cell including a cell that is formed by sandwiching solid polymer membrane between an anode and a cathode that generates electricity with stability and high performance by evenly moistening the solid polymer membrane. For this purpose, in a gas diffusion layer 24, which is positioned adjacent to a cathode catalyst layer 22, the content of fluororesin in an area on the side of the entrance for the oxidizer is set to be higher than in another area on the side of the exit so that the water repellency in the entrance side area is higher than in the exit side area. As a result, a water permeation suppressing part 24A, where the water permeability is relatively low, is formed in the area on the entrance side, while a water permeable part 24B, where the water permeability is relatively high, is formed in the area on the exit side.

16 Claims, 12 Drawing Sheets

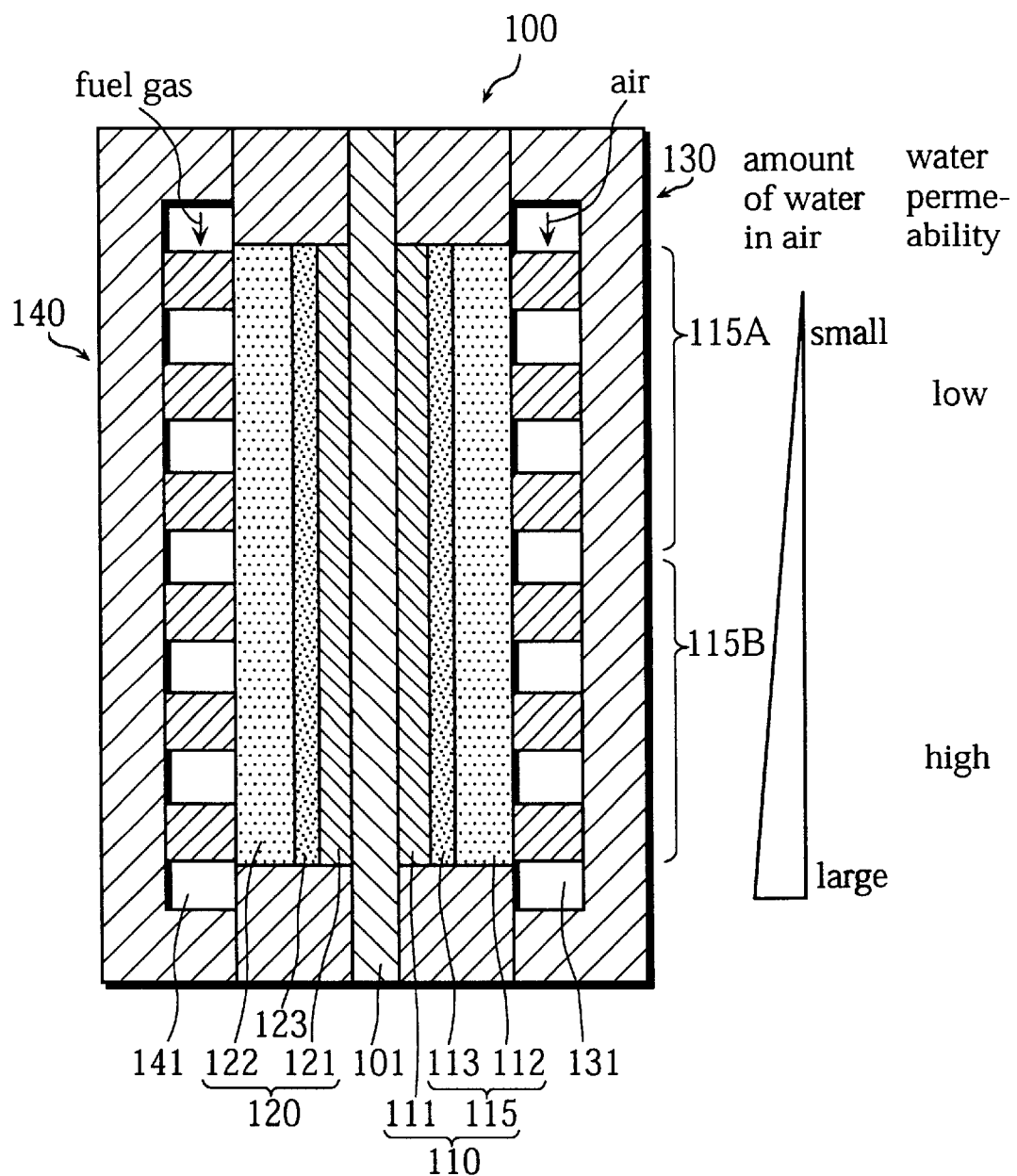

FUEL CELL HAVING WATER PERMEABILITY ADJUSTMENT CAPABILITY

This application is based on application Ser. Nos. 11-176084 and 2000-121616 filed in Japan, the contents of which are hereby incorporated by reference.

BACKGROUND OF THE INVENTION (1) Field of the Invention

The present invention relates to a fuel cell in which the solid polymer membrane is used as the electrolyte film.

(2) Related Art

The fuel cell is a cell that generates electricity by supplying hydrogen-rich fuel gas to the anode and oxidizer gas to the cathode and by electrochemically reacting hydrogen and oxygen. As the oxidizer, air is generally used. On the other hand, as the fuel gas, pure hydrogen gas, reformed lower alcohol, or reformed light hydrocarbon such as reformed natural gas and reformed naphtha is used.

There are a variety of fuel cells according to the kinds of the electrolyte, for instance, the phosphoric acid type fuel cell and molten carbonate fuel cell. Especially, the fuel cell in which the solid polymer membrane is used as the electrolyte film has been recently under development.

The basic structure of this type of fuel cell is as follows. A cell is formed by disposing a cathode on one side of a solid polymer membrane and an anode on the other side. The cell is sandwiched between a plate with fuel gas channels and a plate with oxidizer channels. This fuel cell can generate electricity with high performance at a relatively low operating temperature. In a practical fuel cell, such cell units are stacked in layers to obtain high power output.

The dry solid polymer membrane has lower ion conductivity. As a result, moistened fuel gas and oxidizer gas are generally supplied to the fuel cell in order to moisten the solid polymer. Recently, however, the fuel cell to which dry air is supplied has been developed since the demand to make the fuel cell more compact has grown.

In order to generate electricity by this fuel cell with high performance, it is preferable to evenly moisten the solid polymer membrane. In fact, however, the solid polymer membrane is not evenly moistened, i.e., the solid polymer membrane is overly moist or dry in some parts.

More specifically, around the entrance for the oxidizer (around the entrance for air), water tends to evaporate into the oxidizer gas, so that the solid polymer membrane tends to dry. Especially, in the dry-air-type fuel cell, a large amount of water is dissipated from the solid polymer membrane at the entrance of the oxidizer, so that the solid polymer membrane tends to dry in this part.

When flowing through the gas channels, the oxidizer gas absorbs water from the cell. As a result, the humidity of the oxidizer increases and it becomes more difficult to dissipate water into the gas as the oxidizer travels from the entrance through the exit.

If the humidity of the oxidizer is set high, the solid polymer membrane can be moist enough at the entrance for the oxidizer. In this case, however, the solid polymer membrane is overly moist at the exit, so that high electricity generation performance cannot be obtained.

A proposed solution to this problem is Japanese Patent Laid-Open Publication No. 11-154523. This application proposes a cell in a solid polymer electrolyte fuel cell in which gas permeability is lower at the entrance for the gas than at the exit in the gas diffusion layer on the cathode and/or the gas diffusion layer on the anode.

In the solid polymer electrolyte fuel cell, the solid polymer membrane 201 is sandwiched between the cathode 210 and the anode 220 in the cell, and electricity is generated by flowing the oxidizer gas (the arrow 231) cross the cathode 210 and the fuel gas (the arrow 232) across the anode 220 as shown in FIG. 12. The gas diffusivity in the part 211, which is closer to the entrance for the gas, is set to be smaller than that in the part 212, which is closer to the exit for the gas. The gas diffusivity is adjusted by changing the thickness and the ratio of pores of the gas diffusion layer. More specifically, the gas diffusivity is set relatively small by setting the ratio of pores small or the thickness large in the entrance part 211. On the other hand, the gas diffusivity is set relatively large by setting the ratio of pores large or the thickness small in the exit part 212.

As has been described, the solid polymer membrane 201 can be prevented from drying at the entrance for the oxidizer gas by differently adjusting the gas diffusivity in different parts. In this case, however, the oxidizer is not evenly distributed across the cathodes and the concentration polarization is large in the electrode reaction, so that the power output is lowered. This is problematic phenomenon.

SUMMARY OF THE INVENTION

It is accordingly the object of the present invention to provide a fuel cell including a cell that is formed by sandwiching a solid polymer membrane between an anode and a cathode that generates electricity with stability and high performance by evenly moistening the solid polymer membrane.

The above-mentioned first object may be achieved by disposing a layer on the cathode catalyst layer so as to face the oxidizer channels, the layer being conductive and gas-permeable, water permeability of which is set to be lower in an area closer to an entrance for the oxidizer than in an area closer to an exit for the oxidizer.

Here, the water permeability indicates the amount of water that moves through a unit area of a layer when the water concentration on one side of the layer is different from the water concentration on the other side. More amount of water moves through the layer, higher the water permeability.

When the layer in which the water permeability has been adjusted is formed between the cathode catalyst layer and the oxidizer channels in this manner, the tendency that the amount of water evaporating from the solid polymer membrane is larger at the entrance for oxidizer gas than at the exit can be repressed. As a result, the solid polymer membrane can be evenly moistened.

The gas diffusivity can be kept even irrespective of the layer in which the water permeability has been adjusted, so that the oxidizer can be evenly spread in the electrode.

As a result, according to the present invention, the ion exchange can be ensured and the amount of oxidizer gas supplied to the catalyst layer can be even in any area in the cell.

The layer adjusting the water permeability may have the function of a gas diffusion layer by being formed of a conductive, porous material that includes a water repellent. In this case a content of the water repellent in the area closer to the entrance for the oxidizer may be set to be higher than a content of the water repellent in the area closer to the exit for the oxidizer.

The water permeability adjusting layer may include: a gas diffusion layer that is formed of a water-repellent, conductive, porous material; and a mixture layer that is disposed between the gas diffusion layer and the cathode catalyst layer, the mixture layer being formed of a carbon material to which a water-repellent material has been added.

In this case, the water permeability may be adjusted by setting the specific surface area of a first carbon material in the area closer to the entrance for the oxidizer smaller than a specific surface area of a second carbon material in the area closer to the exit for the oxidizer, and by adding the water-repellent material to the carbon material so that water repellency of the mixture layer is higher in the area closer to the entrance for the oxidizer than in the area closer to the exit for the oxidizer.

Note that when the mixture layer is formed mainly of a carbon material as has been described, the mixture layer keeps water. As a result, a water-keeping layer is formed between the gas diffusion layer and the catalyst layer. The water-keeping layer can keeps the solid polymer membrane with higher stability.

According to the present invention, the solid polymer membrane can be kept moist at the entrance for oxidizer even if dry oxidizer gas (air) is supplied, so that electric power can be generated with stability.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 6 is a vertical sectional view of the cell unit in FIG. 5 taken in the direction of the width;

DESCRIPTION OF THE PREFERRED EMBODIMENT

The First Embodiment

An explanation of a polymer electrolyte fuel cell will be given first. Then, a detailed explanation of the cell structure will be given.

Structure and Operation of Fuel Cell System

Figure 1:
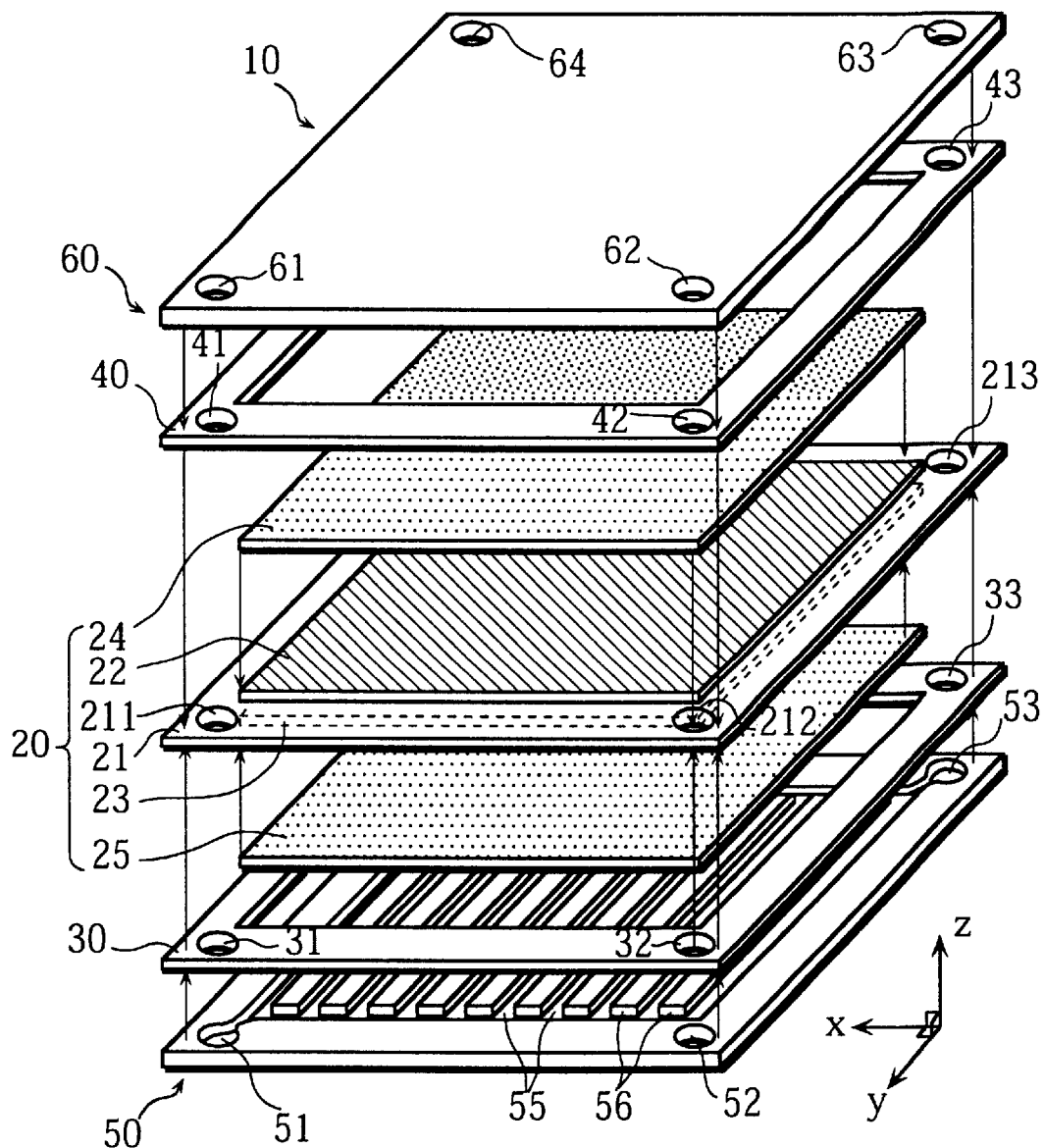
FIG. 1 is a construction drawing of a cell unit that is included in a polymer electrolyte fuel cell according to the first embodiment.

FIG. 1 is a construction drawing of a cell unit 10 that is included in a polymer electrolyte fuel cell according to the first embodiment.

As shown in FIG. 1, the cell unit 10 is formed by sandwiching a cell 20 (a polymer/electrode assembly) between a cathode separator plate 60 and an anode separator plate 50.

The cell 20 is formed by disposing a cathode on one side of a solid polymer membrane 21 and an anode on the other side.

The cathode includes a cathode catalyst layer 22, which is formed on one side of the solid polymer membrane 21, and a gas diffusion layer 24, which is disposed on the cathode catalyst layer 22. The anode includes an anode catalyst layer 23, which is formed on the other side of the solid polymer membrane 21, and a gas diffusion layer 25, which is disposed on the anode catalyst layer 22.

As a result, the gas diffusion layer 24 is disposed between the cathode catalyst layer 22 and the cathode separator plate 60, and the gas diffusion layer 25 is disposed between the anode catalyst layer 23 and the anode separator plate 50.

The solid polymer membrane 21 is an electrolyte membrane of perfluorocarbon sulfonic acid (for instance, Nafion 112 manufactured by Du Pont).

The cathode catalyst layer 22 and the anode catalyst layer 23 are films of platinum catalyst-supporting carbon and are attached onto the principal surface of the solid polymer membrane 21 by hot press so as to come into contact with the solid polymer membrane 21. As the platinum catalyst, Pt catalyst or Pt-Ru catalyst is used. Working favorably when pure hydrogen is used as the fuel gas, the Pt catalyst may be poisoned and have lowered catalysis when carbon monoxide is included in the fuel gas. On the other hand, Pt-Ru catalyst resists poisoning.

Note that the anode catalyst layer 23 is disposed on the lower surface of the solid polymer membrane 21 and is indicated by dashed line in FIG. 1.

The gas diffusion layers 24 and 25 are also called current collectors and are made of a gas-permeable, conductive material. In this specification, a piece of carbon paper is used that is moistened with a water repellent, polytetrafluoroethylene (PTFE), which is a fluororesin. Also, a piece of carbon paper that has been made water-repellent and charged with carbon particles may be used.

The anode separator plate 50 is an injection molded element of mixture of phenol resin and carbon powder. On one surface of the anode separator plate 50 that faces the gas diffusion layer 25 (the lower surface of the gas diffusion layer 25 in FIG. 1), channels 55 are formed between ribs 56. Through the channels 55, fuel gas (hydrogen-rich fuel gas) flows in the direction of y.

The cathode separator plate 60 is an element that is almost the same as the anode separator plate 50. Not illustrated in FIG. 1, channels 65, through which oxidizer gas (air) flows in the direction of y, are formed between ribs.

In the solid polymer membrane 21, gaskets 30 and 40, the cathode separator plate 60, and the anode separator plate 50, holes 61 to 64, 41 to 44, 211 to 214, 31 to 34, and 51 to 54 are bored at the four corners. (The holes 44, 214, 34, and 54 are not illustrated.)

The holes 53, 33, 213, 43, and 63 form a manifold for supplying the fuel gas to the channels 55 on the anode separator plate 50, and the holes 51, 31, 211, 41, and 61 a manifold for discharging the fuel gas. On the other hand, the holes 54, 34, 214, 44, and 64 form a manifold for supplying the oxidizer to the channels 65 on the cathode separator plate 60, and the holes 52, 32, 212, 42, and 62 a manifold for discharging the oxidizer.

Figure 2:
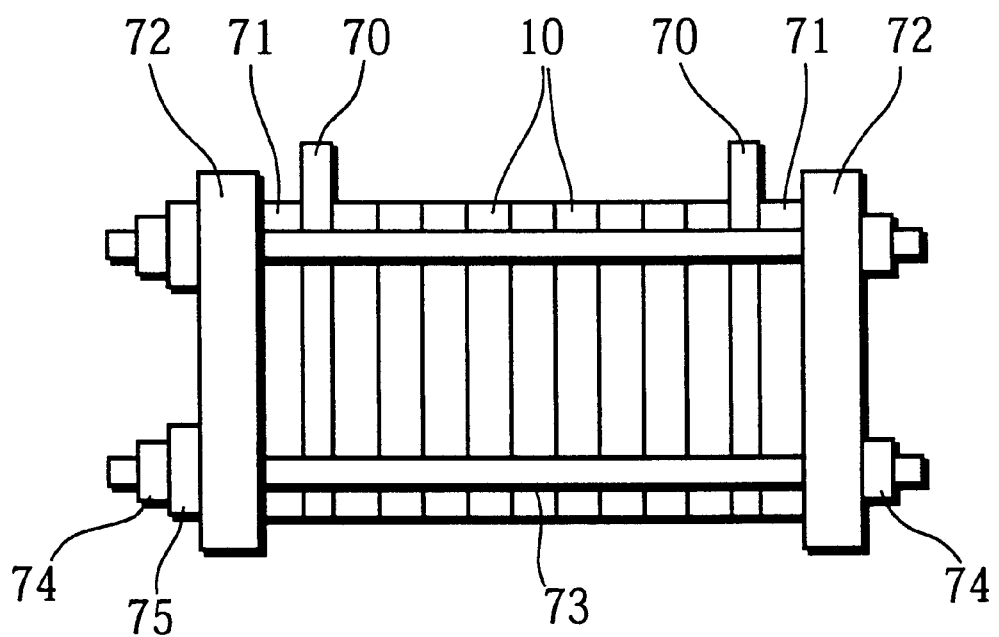
FIG. 2 shows the construction of a fuel cell stack according to the first embodiment.

Note that a plurality of cell units 10 are stacked in layers as shown in FIG. 2 so as to generate high voltage and electric power. The cell units 10 are sandwiched between collector plate 70, insulating plates 71, and clamping plates 72 and are clamped with bolts 73 and nuts 74 to form a fuel cell stack. The insulating plates 71 are used for electrical and heat insulating. The clamping plates 72 are used for imposing loads on the units 10 so as to keep the cell units 10 in layers. Note that the loads are imposed with a disc spring 75.

Detailed Explanation of Cell Structure

Here, a detailed explanation of the cell structure will be given.

Figure 3:
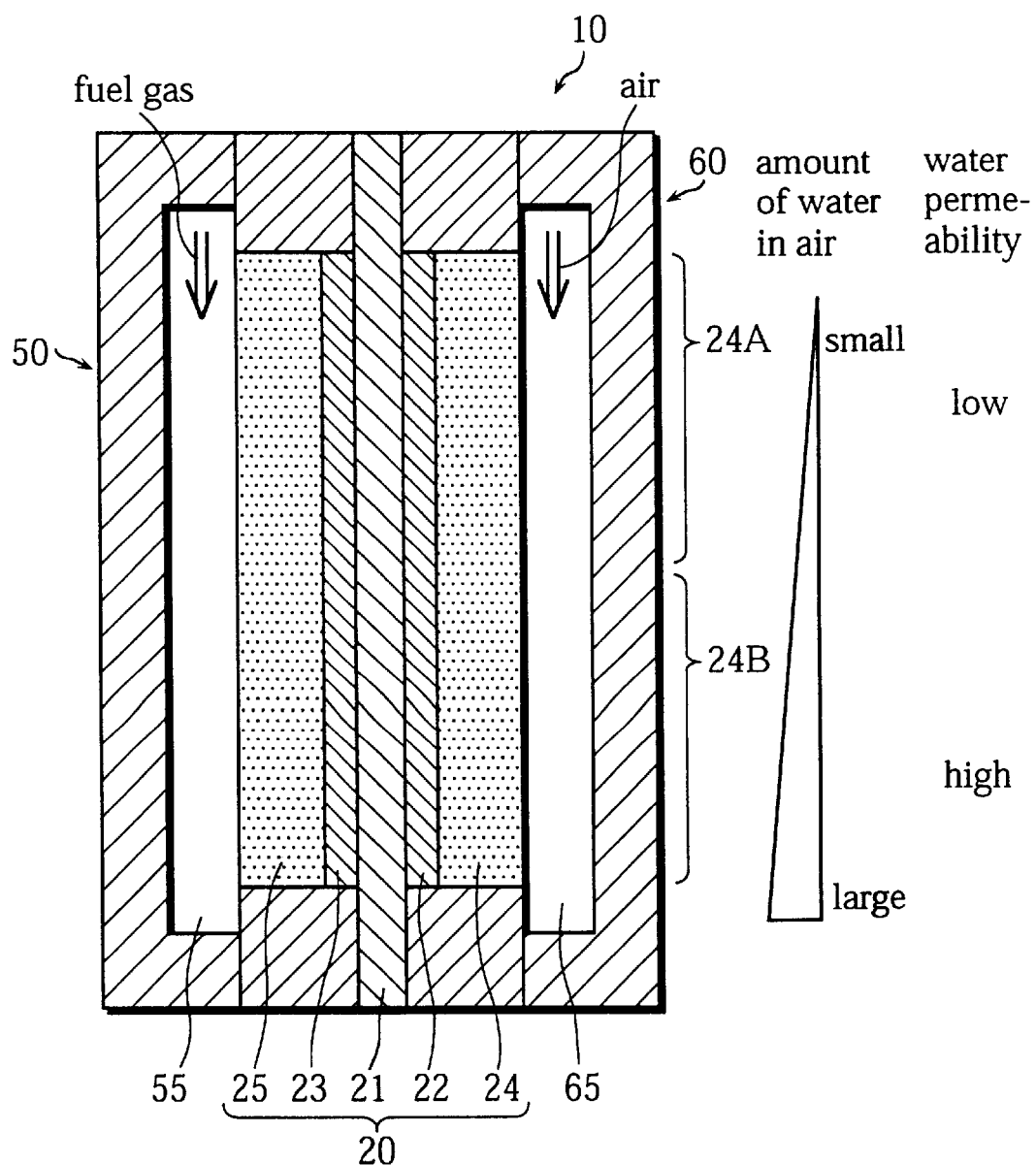
FIG. 3 is a vertical sectional view of the cell unit.

FIG. 3 is a vertical sectional view of the cell unit 10 (taken in plane yz of FIG. 1).

Here, the gas diffusion layer 24 between the cathode catalyst layer 22 and the channels 65 is composed of a water permeation suppressing part, where water permeability is relatively low, in an area extending from the end on the side of the entrance for oxidizer gas (air), i.e., on the side of the hole 64, and a water permeable part, where the water permeability is relatively high, in an area extending from the end on the side of the exit for air.

In the present embodiment, the gas diffusion layer 24 is set to include a greater (for instance, double) amount of fluororesin in the area closer to the entrance for the air so as to have higher water repellency in the area than in the area closer to the exit. By doing so, a water permeation suppressing part 24A is formed in the area closer to the entrance for the air and the water permeable part 24B in the area closer to the exit (in the remaining area of the gas diffusion layer 24.

Here, an explanation of the effects of adjusting the water permeability in this way will be given.

During the operation of the fuel cell, at least one of the fuel gas and the air is humidified before supplied to the channels.

The fuel gas that is to be supplied to the fuel cell is supplied to the anode catalyst layer 23 via the gas diffusion layer 25. In the anode catalyst layer 23, hydrogen in the fuel gas ionizes and emits electrons ($H_2 \rightarrow 2H^+ + 2e^-$). The proton generated here moves towards the cathode catalyst layer 22 in the solid polymer membrane 21. With the move of the proton, the water in the anode catalyst layer 23 also moves towards the cathode catalyst layer 22.

On the other hand, the air is supplied to the cathode catalyst layer 22 via the gas diffusion layer 24. In the catalyst layer 22, oxygen in the air is united with the proton that has moved in the solid polymer membrane 21 to form water ($O_2 + 2e^- + 2H^+ \rightarrow H_2O$).

The solid polymer membrane 21 is humidified by the humidified water and the formed water.

Generally, the air that is to be supplied to the fuel cell is not saturated with water, so that the water in the solid polymer membrane 21 evaporates into the air flowing the channels 65 via the cathode catalyst layer 22 and the gas diffusion layer 24. As a result, the air flowing the channels 65 includes smaller amount of water at the entrance for air than at the exit (the water concentration has a gradient from the entrance to the exit).

As a result of the water concentration gradient, the water in the solid polymer membrane 21 tends to overly evaporate at the entrance for air especially when dry air is supplied.

In the cell unit 10, however, water evaporation from the solid polymer membrane 21 is suppressed by improving the water repellency of the gas diffusion layer 24 in the area closer to the entrance for air, i.e., by forming the water permeation suppressing part 24A, as shown in FIG. 3, so that the amount of evaporating water is uniformized.

As a result, even when oxidizer gas that includes relatively less amount of water is supplied, the solid polymer membrane 21 is moist in a preferable condition as a whole.

Note that not drastically effected by the change of the water repellency, the gas diffusivity of the gas diffusion layer 24 can be kept even.

As a result, power generation can be realized with stable and improved cell voltage.

For these effects, it is preferable to set the ratio of the area of the water permeation suppressing part 24A to the entire area of the gas diffusion layer 24 within 10 to 90%.

Note that the preferable amount of water-repellent material in the water permeation suppressing part 24A and the preferable ratio of the area of the water permeation suppressing part 24A to the area of the gas diffusion layer 24 change according to the operation conditions. For instance, water tends to evaporate when dry air is supplied or the operating temperature is relatively high. In this case, it is preferable to set the amount of water-repellent material and the area of the water permeation suppressing part 24A to be relatively large.

Cell Performance Comparative Experiment

According to the first embodiment, practical and comparative examples of cell are manufactured according to the specification below. Using these cells, power generation experiment is performed.

Table 1

Solid polymer membrane: perfluorocarbon sulfonic acid Membrane (Nafion 112 film, 12 cm×12 cm, 50 μm thick)

Cathode catalyst layer and anode catalyst layer: 10 cm×10 cm, 20 cm thick

Gas diffusion layer: 10 cm×10 cm, 200 μm thick

For the practical examples 1 to 4, the ratio between the area of the water permeation suppressing part 24A and the area of the water permeable part 24B is 1:1 (50 cm² both)

The amount of fluororesin in the gas diffusion layer 24 at the water permeation suppressing part 24A is set to be 26, 30, 50, and 60 w %. At the water permeable part 24B, 25 w % in common.

For the comparative examples 1 and 2, the amount of fluororesin in the gas diffusion layer on the cathode is set to be even.

For the practical and comparative examples, the ratio of the amount of fluororesin in the water permeation suppressing part to the amount of fluororesin in the water permeable part in the gas diffusion layer is indicated by A/B in Table 1.

Each of the cells is manufactured as follows.

Gas diffusion layer on the cathode: for the practical examples 1 to 4, carbon paper (200 μm thick) is moistened in PTFE-dispersed solution. After spraying of the PTFE-dispersed solution on the area corresponding to the water permeation supressing part (5 cm×10 cm), the gas diffusion layer is calcinated at 380° C. for one hour. Other manufacturing conditions are the same as the practical examples 1 to 4.

As a result, gas diffusion layers are manufactured for the practical examples 1 to 4. The amount of fluororesin is 26, 30, 50, and 60 wt % at the water permeation suppressing part and 25 wt % at the water permeable part.

The gas diffusion layers on the cathode for the comparative examples 1 and 2 are manufactured by moistening the carbon paper in the PTFE-dispersed solution, in which the PTFE density has been adjusted, and calcinating the carbon paper at 380° C. for one hour. Other manufacturing conditions are the same as the practical examples 1 to 4.

Gas diffusion layer on the anode: Carbon paper (200 $\mu$m thick) is calcinated at 380° C. for one hour after moistened in the PTFE-dispersed solution. As a result, gas diffusion layers on the anode are manufactured with 25 wt % fluororesin amount.

Cathode and anode catalyst layers: Pt-supporting carbon powder, Nafion solution, PTFE-dispersed solution are mixed so that the weight ratio of carbon powder:Nafion:PTFE is 100:20:10 to manufacture slurry. By applying the slurry onto the gas diffusion layers, cathode and anode catalyst layers are formed.

The solid polymer membrane is sandwiched between the gas diffusion layers (on the anode and cathode), on which the cathode and anode catalyst layers have been formed, and then hot press is performed on the solid polymer membrane and the cathode and anode catalyst layers on the condition of 150° C.–60 sec. In this way, a cell is manufactured.

Cell Voltage Measurement

The cells of the practical and comparative examples are operated on the condition as follows and the cell voltage is measured with time.

Current density: 0.5A/cm$^2$

Operating temperature in cell: 80° C.

Fuel gas: pure hydrogen

Oxidizer gas: air

Fuel gas utilization ratio: 70%

Oxidizer gas utilization ratio: 40%

Figure 4:
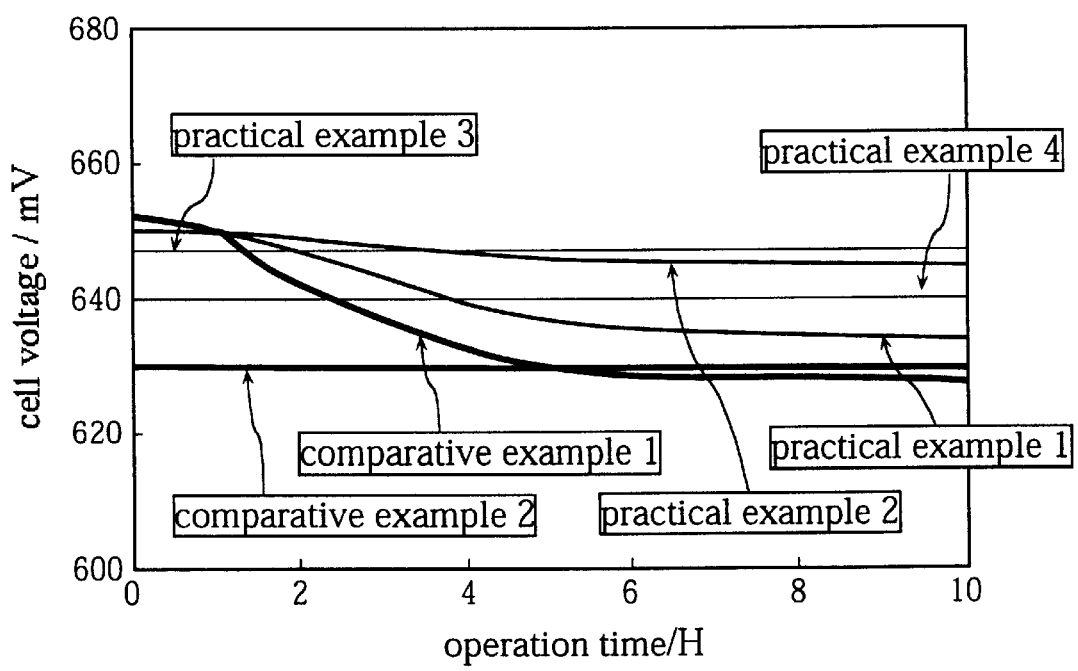
FIG. 4 shows the result of cell voltage measurement experiment for practical examples.

FIG. 4 shows the measurement result and is a plot showing the relation between the operation time and the cell voltage when the cells are operated on the condition described above.

Consideration:

FIG. 4 shows that the cell voltage is higher for the practical examples 1 to 4 than for the comparative examples 1 and 2 although it takes some amount of time to stabilize the cell voltage for some of the practical examples 1 to 4.

This result can be explained in this way. For the practical examples 1 to 4, the amount of fluororesin is larger at the entrance for air than at the exit in the gas diffusion layer on the cathode. As a result, during steady operation, the solid polymer membrane is moist evenly at the entrance for air and at the exit compared with the comparative examples 1 and 2, for which the amount of fluororesin is even in the gas diffusion layer on the cathode.

Here, the cell voltage is compared among the practical examples 1 to 4. The cell voltages of the practical examples 1 and 2 are relatively high during the early stages of operation and the cell voltage of the practical example 1 stabilizes after substantially decreasing with time. The cell voltage of the practical example 2 stabilizes after slightly decreasing with time. On the other hand, the cell voltages of the practical examples 3 and 4 (especially, the practical example 3) are ideal cell voltages. These cell voltages stabilize from the early stages of operation.

This can be explained in this way. For the practical example 1, the amount of fluororesin at the water permeation suppressing part, i.e., at the entrance for air, is relatively small (the value of A/B is relatively small). As a result, while the solid polymer membrane is moist enough at the entrance for air during the early stages of operation, the water goes to some extent with time after the beginning of power generation. The practical example 2 slightly shows the same tendency. On the other hand, for the practical examples 3 and 4, the amount of fluororesin at the water permeation suppressing part is relatively large (the value of A/B is relatively large), so that water is kept in the solid polymer membrane and the moisture during the early stages of operation is also kept.

Compared with the practical example 3, the cell voltage of the practical example 4 is low. It is assumed that the gas permeability is slightly degraded due to the slightly large amount of fluororesin in the water permeation suppressing part (slightly large value of A/B).

As a result, it is preferable to set the ratio A/B in the gas diffusion layer (ratio of the amount of fluororesin in the water permeation suppressing part to the amount of fluororesin in the water permeable part) within 1.05 to 2.00.

Note that the cell voltage of the comparative example 2 is stable at a lower level in FIG. 4. This can be explained in this way. The water evaporation from the solid polymer membrane can be suppressed due to the high water repellency of the gas diffusion layer at both of the water permeation suppressing part and the water permeable part. As a result, the moisture of the solid polymer membrane can be ensured from the early stages of operation. On the other hand, the cathode catalyst layer is overly moist at the exit for air, so that sufficient gas permeability cannot be obtained.

Another experiment shows that sufficient water repellency cannot be obtained when the amount of fluororesin in the gas diffusion layer on the cathode at the entrance for air is less than 15 wt % and that the gas permeability is extremely degraded when the amount of fluororesin is greater than 90 wt %.

As a result, it is preferable to set the amount of fluororesin in the gas diffusion layer on the cathode at the entrance for air within 15 to 90 wt %.

Note that as the water repellent for the gas diffusion layer, fluororesin other than PTFE and other materials can be used.

In the first embodiment, the channels for the oxidizer gas and fuel gas run in parallel in the cell unit. The directions of the channels, however, are not limited in this case. For instance, the channels for the oxidizer gas and fuel gas can intersect orthogonally.

The Second Embodiment

Figure 5:
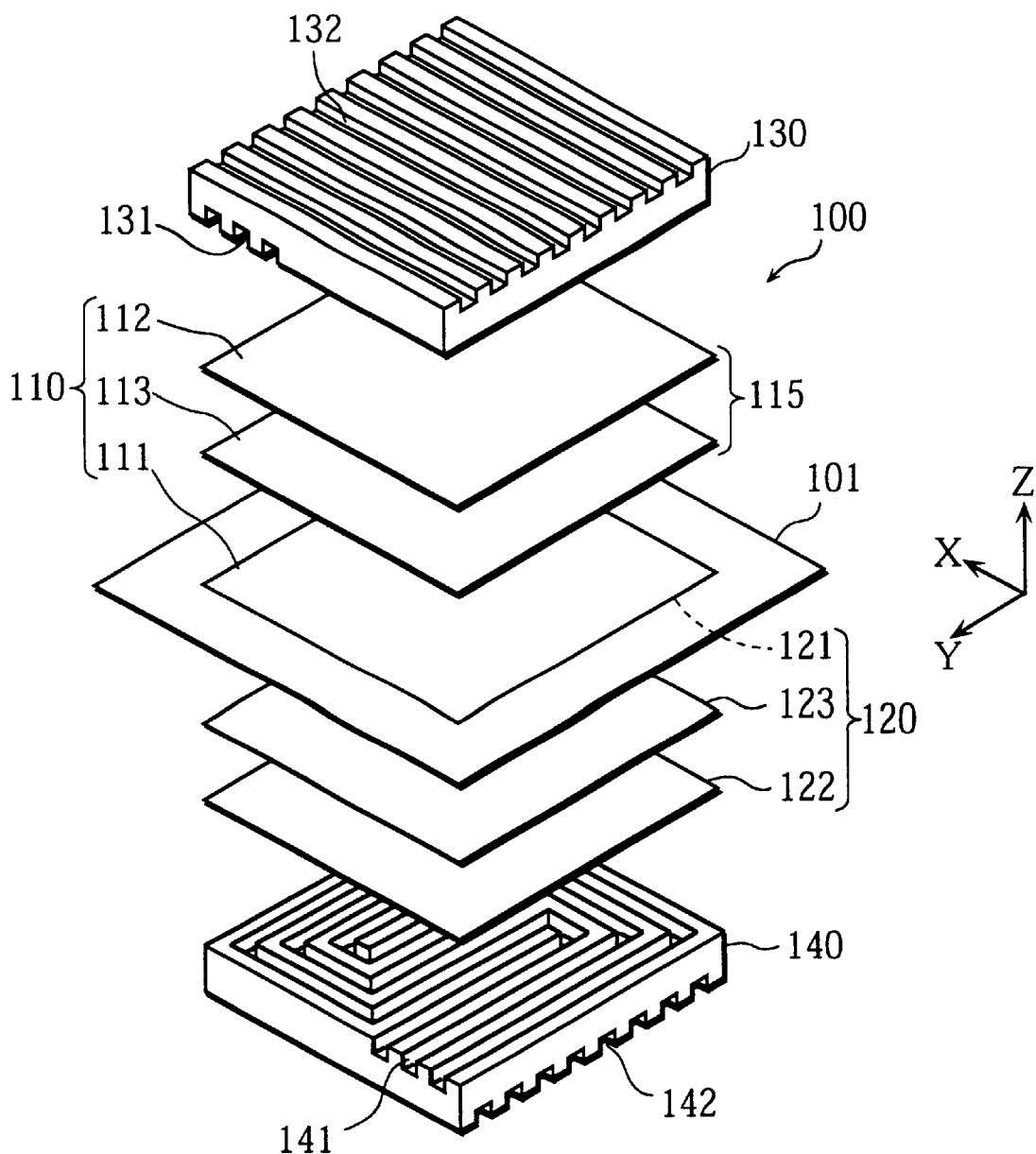
FIG. 5 is a exploded view showing the cell unit structure of a fuel cell according to the second embodiment.

FIG. 5 is a exploded view showing the cell unit structure of a fuel cell according to the second embodiment.

FIG. 6 is a vertical sectional view of the cell unit in FIG. 5 taken in the direction of the width (taken in plane xy of FIG. 5).

An explanation of the structure of a cell unit 100 will given below. A cell is formed by disposing a cathode 110 and an anode 120 on different principal surfaces of a solid polymer membrane 101. The cell is sandwiched between a pair of separator plates 130 and 140.

The cathode 110 is composed of a cathode catalyst layer 111, a gas diffusion layer 112, and a mixture layer 113. The cathode catalyst layer 111 is adjacent to the solid polymer membrane 101. The mixture layer 113 is sandwiched between the cathode catalyst layer 111 and the gas diffusion layer 112.

On the other hand, the anode 120 is composed of an anode catalyst layer 121, a gas diffusion layer 122, and a mixture layer 123. The anode catalyst layer 121 is adjacent to the solid polymer membrane 101. The mixture layer 123 is sandwiched between the anode catalyst layer 121 and the gas diffusion layer 122.

Each of the gas diffusion layers 112 and 122 and the mixture layers 113 and 123 is a gas-permeable, electrically conductive layer.

Each of the gas diffusion layers 112 and 122 is formed of a conductive, porous material such as a piece of carbon paper to which a water repellent material is added so as to ensure the gas diffusivity.

Each of the mixture layers 113 and 123 is formed of a carbon material that a water repellent material is added to and mixed with. The mixture layers 113 and 123 have the property of keeping water.

A water repellent material or a base material that has been made water repellent is used as the conductive, porous material for the gas diffusion layer in an area closer to the entrance for oxidizer gas so as to prevent water retention and to keep an appropriate degree of gas permeability in this area. By sandwiching the mixture layer between the catalyst layer and the gas diffusion layer, which are disposed on the solid polymer membrane, the solid polymer membrane is kept moist with stability. Gas permeability is also ensured due to the gas diffusion layer.

As described later, by adjusting the specific surface area of the carbon material that is used for the mixture layer 113 at the entrance and exit for air in the cathode 110, the structure of a layer 115, which covers the cathode catalyst layer 111, is adjusted so as to have lower water permeability at the entrance for air than at the exit.

Each of the separator plates 130 and 140 is a conductive, gas-impermeable plate. On one surface of the separator plate 130 facing the cathode 110, oxidizer gas channels 131 are formed. On the other surface of the separator plate 130, coolant channels 132 are formed. On the other hand, fuel gas channels 141 are formed on one surface of the separator plate 140 facing the anode 120, and coolant channels 142 are formed on the other surface.

Figure 7A:
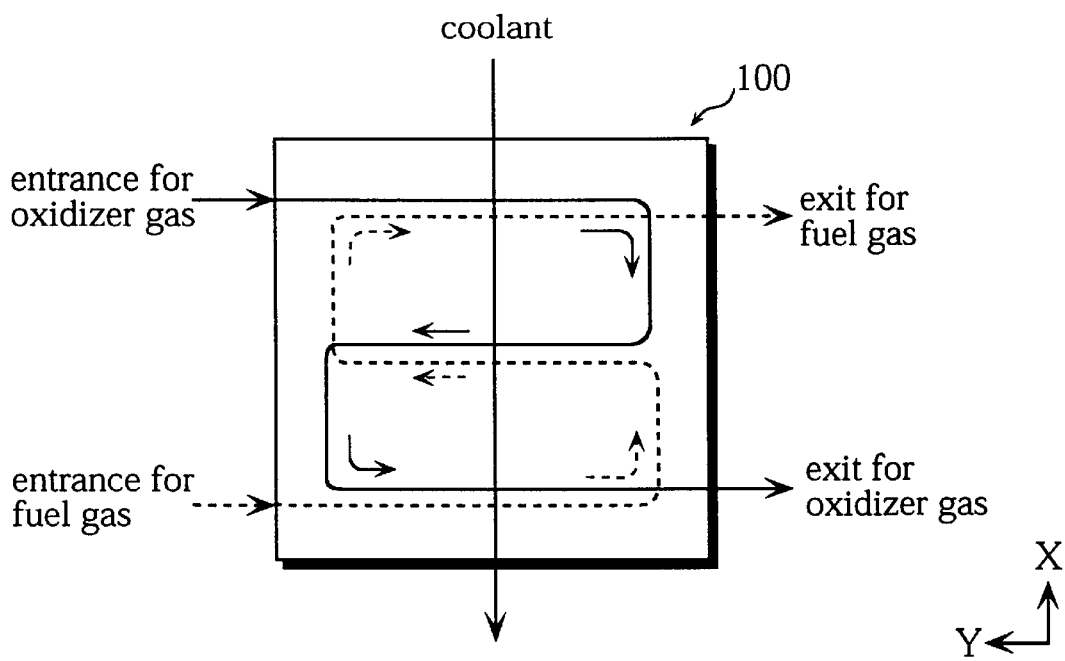
FIG. 7A shows how oxidizer gas, fuel gas, and coolant flow in the cell unit according to the second embodiment.

The oxidizer gas channels 131 and the fuel gas channels 141 in the present embodiment are not simple stripes but run zigzag (in the direction and in the opposite direction of an arrow Y in FIG. 7A). The fluid (the oxidizer gas or the fuel gas) flows through the channels in zigzag so as to travel in a direction that orthogonally intersects the direction of the arrow Y (in the direction and the opposite direction of an arrow X in FIG. 5).

Note that the coolant channels 132 and 142 are stripes running in the direction of the arrow X.

A plurality of cell units 100 are stacked in layers as described in the first embodiment (refer to FIG. 2) to form a fuel cell stack.

FIG. 7A shows how oxidizer gas, fuel gas, and coolant typically flow in the cell unit 100.

The following is an explanation of how the oxidizer gas (air), the fuel gas, and the coolant flow in the cell unit 100.

As shown in FIG. 7A, the oxidizer gas flows through the oxidizer gas channels 131 that run zigzag (in the direction and the opposite direction of the arrow Y) to travel in one direction that orthogonally intersects the direction of the arrow Y (in the opposite direction of the arrow X).

On the other hand, the fuel gas flows through the fuel gas channels 141 that run zigzag (in the direction and the opposite direction of the arrow Y) to travel in one direction that orthogonally intersects the direction of the arrow Y (in the direction of the arrow X).

Note that the air and the fuel gas travel in opposite directions in the examples in FIG. 7A. More specifically, while the air travels in the opposite direction of the arrow X (in the downward direction in FIG. 7A) and the fuel travels in the direction of the arrow X (in an upward direction in FIG. 7A).

In each of the cell units 100, the coolant is supplied from the same side from which the oxidizer gas travels (from the upper part in FIG. 7A). The coolant flowing through the coolant channels 132 and 142 travels in the same direction as the air travels (in the opposite direction of the arrow X, i.e., in the downward direction in FIG. 7A).

Adjustment of Water Permeability of Mixture Layer 113 And Gas Diffusion Layer 112

Figure 7B:
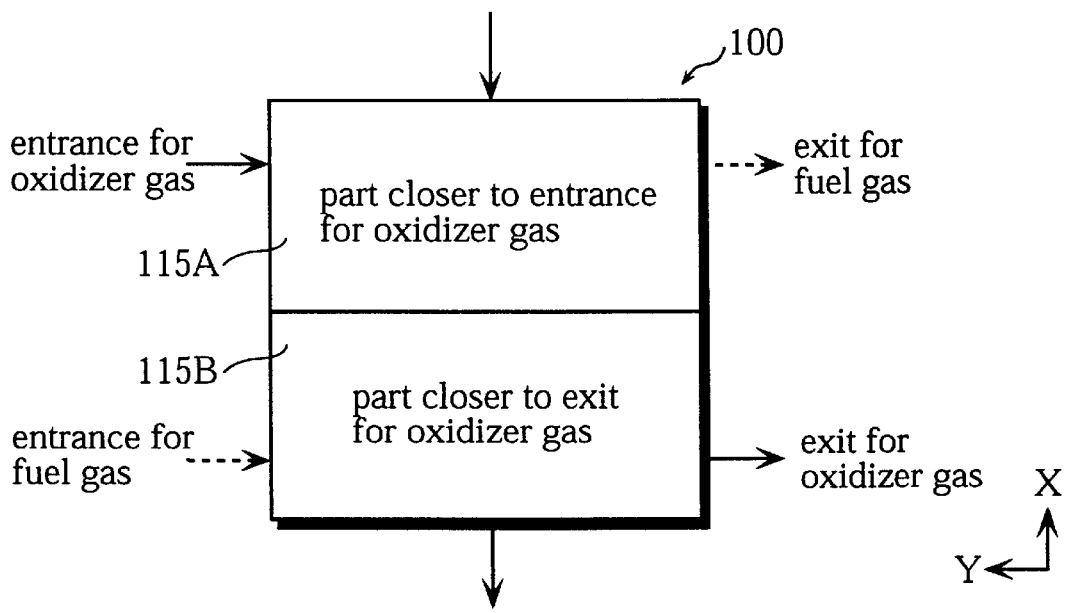
FIG. 7B is an illustration for explaining the effects of the cell unit according to the second embodiment.

FIG. 7B is an illustration for explaining the effects of the cell unit 100.

As in the case of the first embodiment, the layer 115 (the gas diffusion layer 112+the mixture layer 113), which is sandwiched between the cathode catalyst layer 111 and the oxidizer gas channels 131, in the cell unit 100 is composed of a water permeation suppressing part 115A, where water permeability is relatively low, in an fixed area extending from the end on the side of the entrance for oxidizer gas (air), i.e., on the side of the hole 64, and a water permeable part 115B, where the water permeability is relatively high, in the remaining area. In the present embodiment, the water permeability of the layer 115 is adjusted by adjusting the water repellency of the mixture layer 113 adjacent to the cathode catalyst layer 111.

More specifically, carbon power having relatively small specific surface area is used for the mixture layer 113 in the area closer to the entrance for the oxidizer gas. On the other hand, carbon power having relatively large specific surface area is used for the mixture layer 113 in the area closer to the exit for the oxidizer gas.

As a result, the layer 115 is composed of the water permeation suppressing part 115A, where water permeability is relatively low, in an area closer to the entrance for the oxidizer gas and the water permeable part 115B, where the water permeability is relatively high, in an area closer to the exit for the oxidizer gas.

As has been described, the water permeability can be adjusted by adjusting the specific surface area of the carbon material used for the mixture layer 113. When the specific surface area of the carbon material is small, the water absorbency of the capillary attraction of the micropores among the carbon material powder is low, so that it is difficult for water to move through the micropores.

With the layer 115, the water permeability is adjusted in this way, the same effects as the first embodiment can be obtained in the present embodiment.

More specifically, the tendency that the amount of water evaporating from the solid polymer membrane 101 is larger at the entrance for air due to the water concentration gradient in the air passing through the oxidizer gas channels 131 can be repressed. As a result, the solid polymer membrane 101 can be evenly moistened at the entrance and the exit for air.

Note that rarely affected by the change of the specific surface area of the carbon material for the mixture layer 113, the gas permeability of the mixture layer 113 can be kept even.

As in the case of the first embodiment, it is preferable to set the ratio of the area of the water permeation suppressing part 115A to the entire area of the layer 115 within 10 to 90 %.

Note that adjusting the specific surface area of the carbon material for the mixture layer 113 at the entrance and exit for air is not the only way to adjust the water permeability of the mixture layer 113 at the entrance and exit for air. The water permeability can be adjusted by adjusting the amount of water-repellent material that is to be added to at the entrance and exit for air.

Meanwhile, the oxidizer gas is supplied from the same side from which the coolant for this stack is supplied as has been described with reference to FIG. 7A. As a result, the effects below can be expected.

Generally, the temperature of the coolant is set lower than the temperature of the fuel cell, so that the coolant temperature is lowest at the entrance for the coolant and increases as the coolant passes through the stack.

As a result, when the flow directions of the coolant and the oxidizer (air) are the same, the cooling strength is stronger at the entrance for air than at the exit, so that the temperature at the entrance can be kept relatively low.

The amount of water released from the solid polymer membrane 101 into the oxidizer gas (air) decreased as the temperature becomes lower. As a result, by keeping the temperature at the entrance for air relatively low can suppress water release into air and prevent the solid polymer membrane 101 from being dry at the entrance for air.

The Third Embodiment

The cell unit according to the present embodiment is the same as the cell unit 100 in the second embodiment except for the way to adjust the water permeability of the mixture layers 113 and 123.

More specifically, the water permeability of the mixture layer 113 at the entrance and exit for air is adjusted by adjusting the specific surface area of the carbon material used at the entrance and exit in the second embodiment. On the other hand, the water permeability is adjusted by changing the ratio of the amount of water-repellent material to the a mount of the carbon material in the present embodiment. At the entrance for air, the ratio of the amount of the water-repellent material to the amount of the carbon material is larger than at the exit.

As result, as in the case of the first embodiment, the tendency that the amount of water evaporating from the solid polymer membrane 101 is larger at the entrance for air due to the water concentration gradient in the air passing through the oxidizer gas channels 131 can be repressed and the humidity of the solid polymer membrane 101 can be kept even at the entrance and exit for air.

In some cases, the gas diffusivity can decrease when the water permeability of the mixture layer 113 at the exit for air is set as extremely large. In this case, by setting the water permeability of the layer 115 that covers the cathode catalyst layer 111 at the entrance for air is as lower than at the exit and by setting the water permeability of the gas diffusion layer 112 at the entrance as higher than at the exit, water staying at the exit for air is dispersed to the entrance for air. As a result, over-moisture and detriment of the gas permeability of the mixture layer 113 at the exit can be prevented.

As examples of the second and third embodiments, cells of practical examples 5 to 10 are manufactured as follows.

For each of the practical examples 5 to 10, the ratio of the area of the water permeation suppressing part 115A to the area of the water permeable part 115B is set as 1:1.

Practical Example 5

① A piece of carbon paper (TGP-HO60, Toray industries, Inc.) is cut to a predetermined size.

② The carbon paper is moistened by FEP (fluorinated ethylene propylene resin) dispersion, mixture of FEP and water, in which the specific gravity has been adjusted. After drying the carbon paper, one-hour heat treatment at 380° C. is given to form the gas diffusion layer 112.

③ 10 g of carbon black powder having the specific surface area of 700 to 800 $m^2/g$ and 16.7 g of PTFE-dispersed solution having the weight percentage of 60 wt % are mixed and dispersed using terpineol to which several cc of surface active agent has been added as the dispersant to generate the mixed paste for the water permeable part;

④ 10 g of carbon black powder having the specific surface area of 100 to 150 $m^2/g$ and 16.7 g of PTFE-dispersed solution having the weight percentage of 60 wt % are mixed and dispersed using terpineol to which several cc of surface active agent has been added as the dispersant to generate the mixed paste for the water permeation suppressing part.

⑤ The mixed paste that has been generated in ④ is applied onto the gas diffusion layer 112 in the area corresponding to the water permeation suppressing part 115A. On the other hand, the mixed paste that has been generated in the process ③ is applied onto the gas diffusion layer 112 in the area corresponding to the water permeable part 115B.

⑥ After drying of the mixed pastes that have been applied onto the gas diffusion layer 112, one-hour heat treatment at 360° C. is given to form the mixture layer 113 on the gas diffusion layer 112.

⑦ The mixed paste of platinum-supporting carbon (the specific surface area of the catalyst support carbon is 200 to 300 $m^2/g$) and polymer electrolyte (ion exchange resin) is applied onto the mixture layer 113 to form the cathode catalyst layer 111. As a result, the cathode 110 is formed.

⑧ The anode 120 is formed in the same manner as the precesses ① to ⑦. Note that one kind of carbon black powder is used for the entire area of the mixture layer 123 in the process for forming the mixture layer 123 for the anode 120.

Then, the cathode 110 and anode 120 are disposed so as to sandwiches the solid polymer membrane 101 (Nafion 112) and hot press is performed so as to form a cell (a polymer/electrode assembly). The cell is sandwiched between the separator plates 130 and 140 to form the cell unit 100.

A fuel cell stack is manufactured by stacking four cell units 100 in layers.

Practical Example 6

The cell unit 100 is manufactured in the same way as the practical example 5. The amount of the PTFE-dispersed solution having the weight percentage of 60 wt % that is mixed with 10 g of carbon black powder having the specific surface area of 700 to 800 $m^2/g$ is set as 7.0 g when generating the mixed paste for the water permeable part in the process ③.

Practical Example 7

The cell unit 100 is manufactured in the same way as the practical example 5. In this case, instead of the carbon black powder having the specific surface area of 700 to 800 $m^2/g$, carbon black powder having the specific surface area of 200 to 300 m²/g is used when generating the mixed paste for the water permeable part in the process ③.

Practical Example 8

The cell unit 100 is manufactured in the same way as the practical example 5. In this case, instead of the carbon black powder having the specific surface area of 100 to 150 m²/g, carbon black powder having the specific surface area of 200 to 300 m²/g is used when generating the mixed paste for the water permeation suppressing part in the process ④.

Comparative Example 3

The cell unit is manufactured in the same way as the practical example 5. In this case, carbon black powder having the specific surface area of 200 to 300 m²/g is used in the processes ③ and ④.

The specific surface areas of the carbon black powders used for the practical examples 5 to 8 and the comparative example 3 and the ratios of the carbon black powders to the PTFE are shown in Table 2.

Table 2

Practical Example 9

The cell unit 100 is manufactured in the same way as the practical example 5. In this case, the mixed pastes for the water permeation suppressing part and the water permeable part are generated in the processes ③ and ④ as follows.

③ 10 g of carbon black powder having the specific surface area of 200 to 300 m²/g and 7 g of PTFE-dispersed solution having the weight percentage of 60 wt % are mixed and dispersed using terpineol as the dispersant. Then, several cc of surface active agent is added to and mixed with the mixture to generate the mixed paste for the water permeable part.

④ 10 g of carbon black powder having the specific surface area of 200 to 300 m²/g and 16.7 g of PTFE-dispersed solution having the weight percentage of 60 wt % are mixed and dispersed using terpineol as the dispersant. Then, several cc of surface active agent is added to and mixed with the mixture to generate the mixed paste for the water permeation suppressing part.

Practical Example 10

The cell unit 100 is manufactured in the same way as the practical example 9. In this case, the gas diffusion layer is formed as follows.

As in the case of the process ①, a piece of carbon paper is cut to a predetermined size. Then, the carbon paper is moistened by the FEP dispersion, mixture of FEP and water, in which the specific gravity has been adjusted. After drying the carbon paper, only the water permeable part is moistened by the FEP dispersion. After drying the carbon paper again, one-hour heat treatment at 380° C. is given to form the gas diffusion layer 112.

The content of the FEP in the gas diffusion layer 112 that has been formed in this way is 20 wt % at the entrance for air. At the exit, the amount is tremendously large, i.e., 50 wt %.

The weight ratio of the carbon black to the PTFE and the content of the water-repellent material in the gas diffusion layer for the practical examples 9 and 10 are shown in Table 3.

Table 3

Cell Performance Comparative Experiment 1

A fuel cell stack is manufactured for each of the practical examples 5 to 8 and the comparative example 3 by stacking four cell units in layers.

As shown in FIG. 7A, fuel cells are operated with supply of the air, the fuel gas, and the coolant at a variety of current densities, and voltages are measured.

Figure 8:
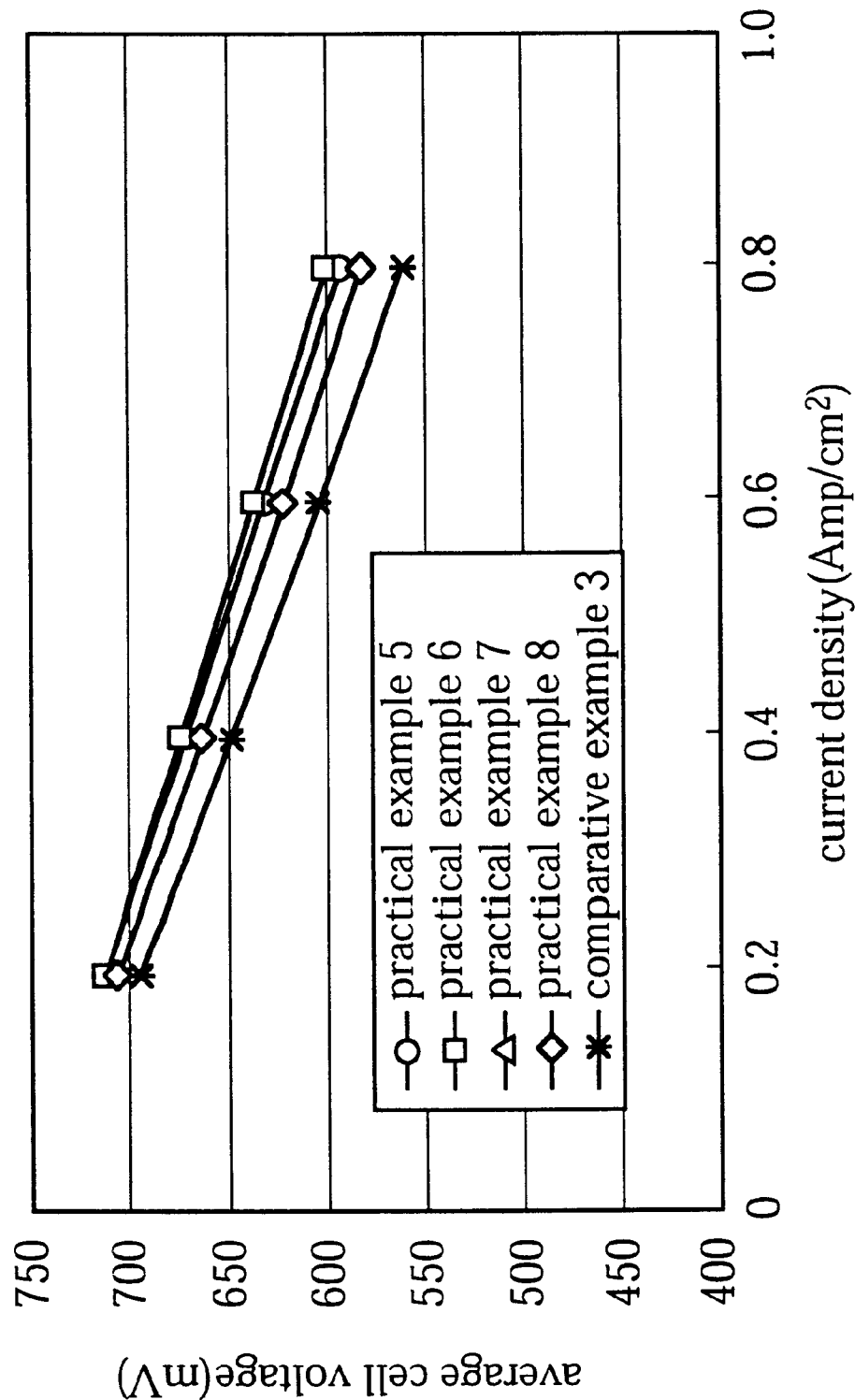
FIG. 8 is a plot showing a result of a cell performance comparative experiment in the second embodiment.

FIG. 8 is a plot showing the result of the experiment. In FIG. 8, the vertical axis indicates the average cell voltage (mV) and the horizontal axis indicates the current density (Amp/cm²).

Also, the fuel cells are operated with a variety of humidifying temperature of the oxidizer gas that is supplied to the fuel cell stacks, and cell voltages are measured.

Figure 9:
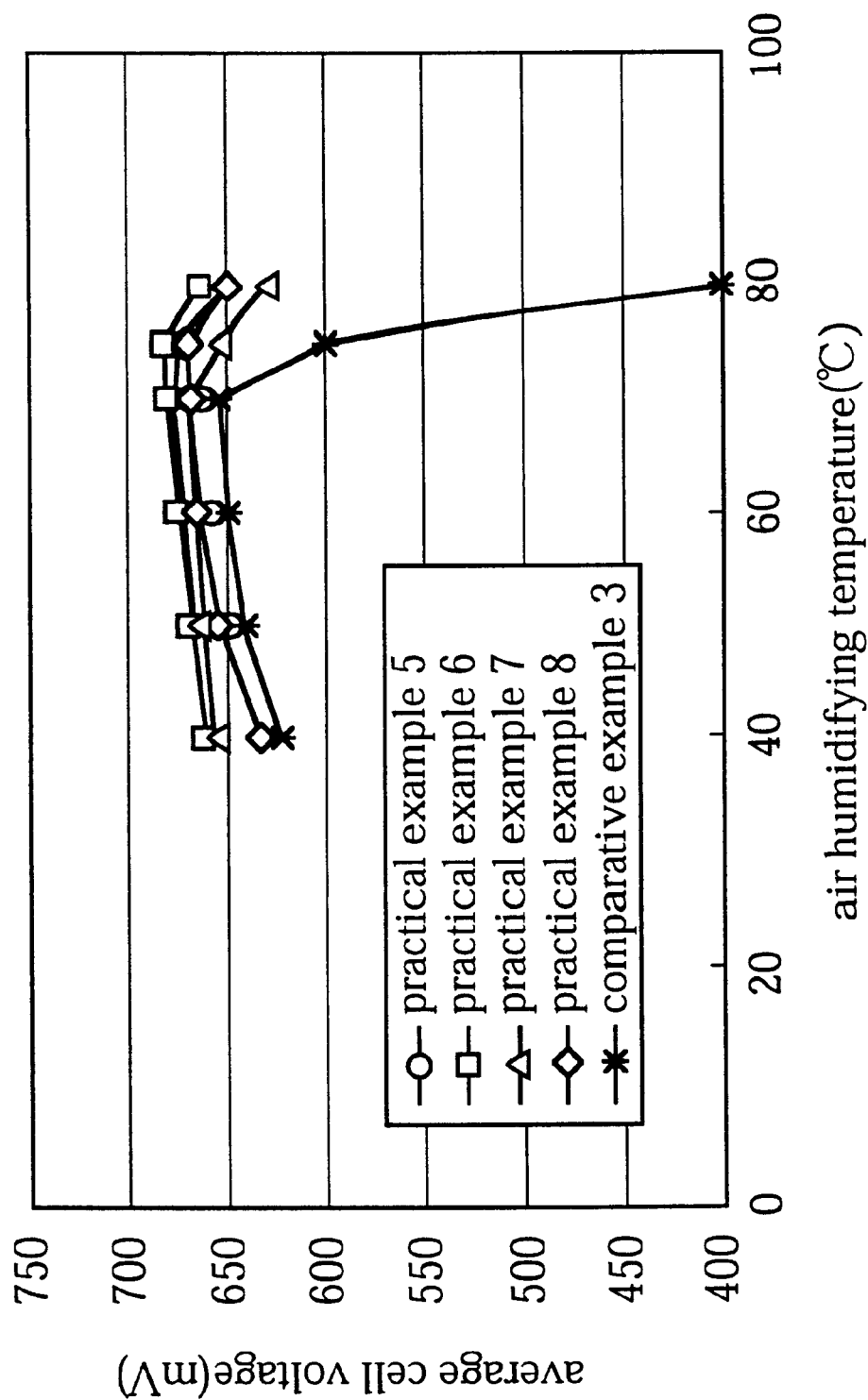
FIG. 9 is a plot showing a result of a cell performance comparative experiment in the second embodiment.

FIG. 9 is a plot showing the result of the experiment. In FIG. 9, the vertical axis indicates the average cell voltage (mV) and the horizontal axis indicates the humidifying temperature of air (° C.).

Consideration:

FIG. 8 shows that favorable output can be obtained for each of the practical examples 5 to 8 compared with the comparative example 3 on the same conditions.

FIG. 9 shows that output slightly changes as the humidifying temperature of the oxidizer gas changes for each of the practical examples 5 to 8. On the other hand, for the comparative example 3, the output drastically drops when the humidifying temperature is increased to raise the humidity.

As shown in FIGS. 8 and 9, favorable output can be obtained for the practical examples 5 to 8. For the practical examples 5 to 8, the specific surface area of the carbon black used for the mixture layer is set as smaller at the entrance for air than at the exit, so that the water permeability of the layer 115 is lower at the entrance than at the exit. As a result, the amount of water permeating the layer 115 is uniformized, so that the solid polymer membrane is kept moist at the entrance for air while not preventing the gas diffusion at the exit.

Among the practical examples 5 to 8, the practical example 6 shows the most favorable cell voltage.

For the practical example 6, the amount of water permeating the layer 115 is adjusted to be almost optimum by adjusting the specific surface area of the carbon material used for the mixture layer 113 and the content of the water-repellent material together, i.e., water does not overly stay in the cathode catalyst layer 111 at the exit for air and drying of the solid polymer membrane 101 can be suppressed at the entrance for air. As a result, favorable cell voltage can be obtained.

Cell Performance Comparative Experiment 2

A fuel cell stack is manufactured for each of the practical examples 9 and 10 and the comparative example 3 in the same manner in the cell performance comparative experiment 1, and cell voltages are measured.

Figure 10:
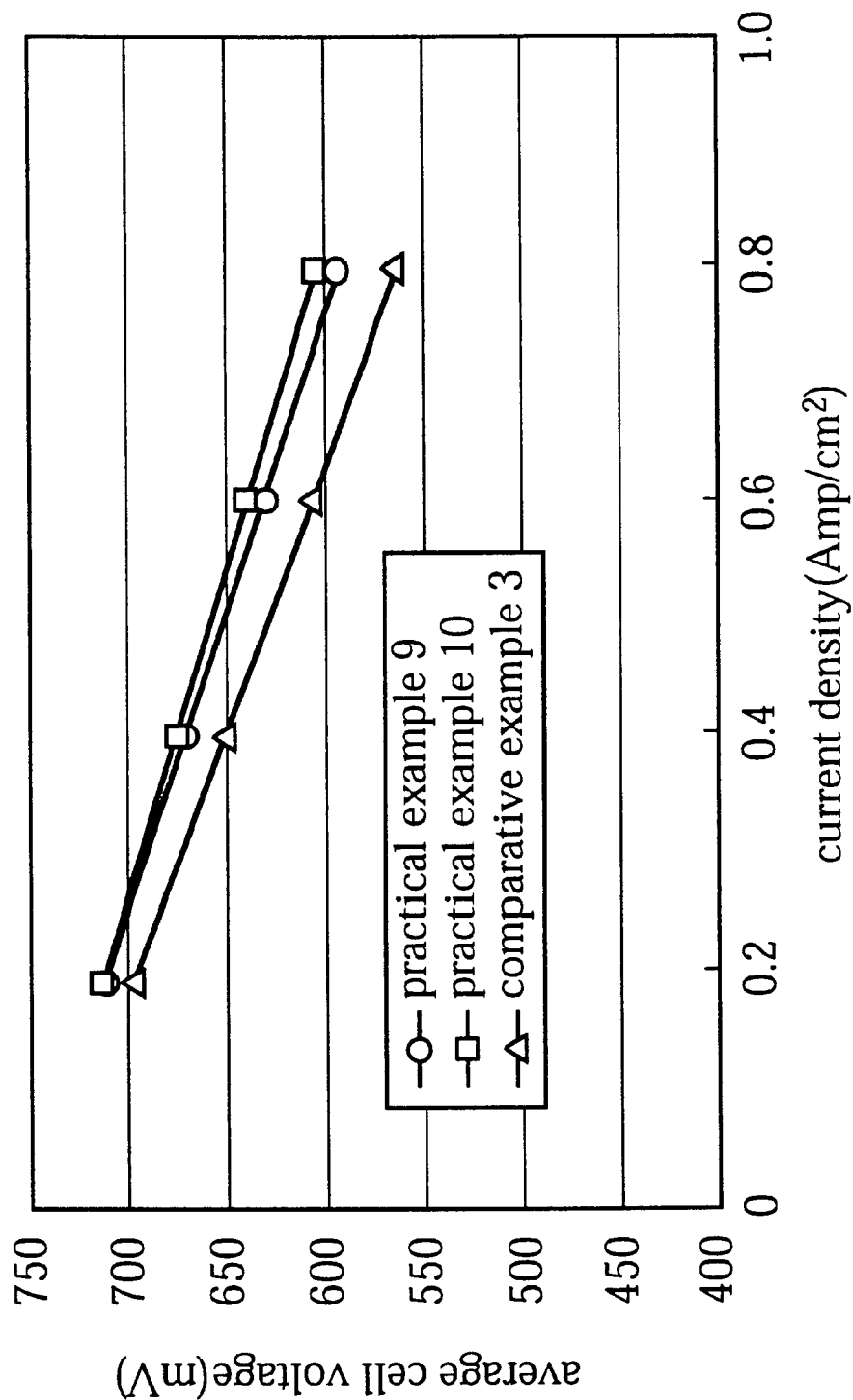
FIG. 10 is a plot showing a result of a cell performance comparative experiment in the third embodiment.
Figure 11:
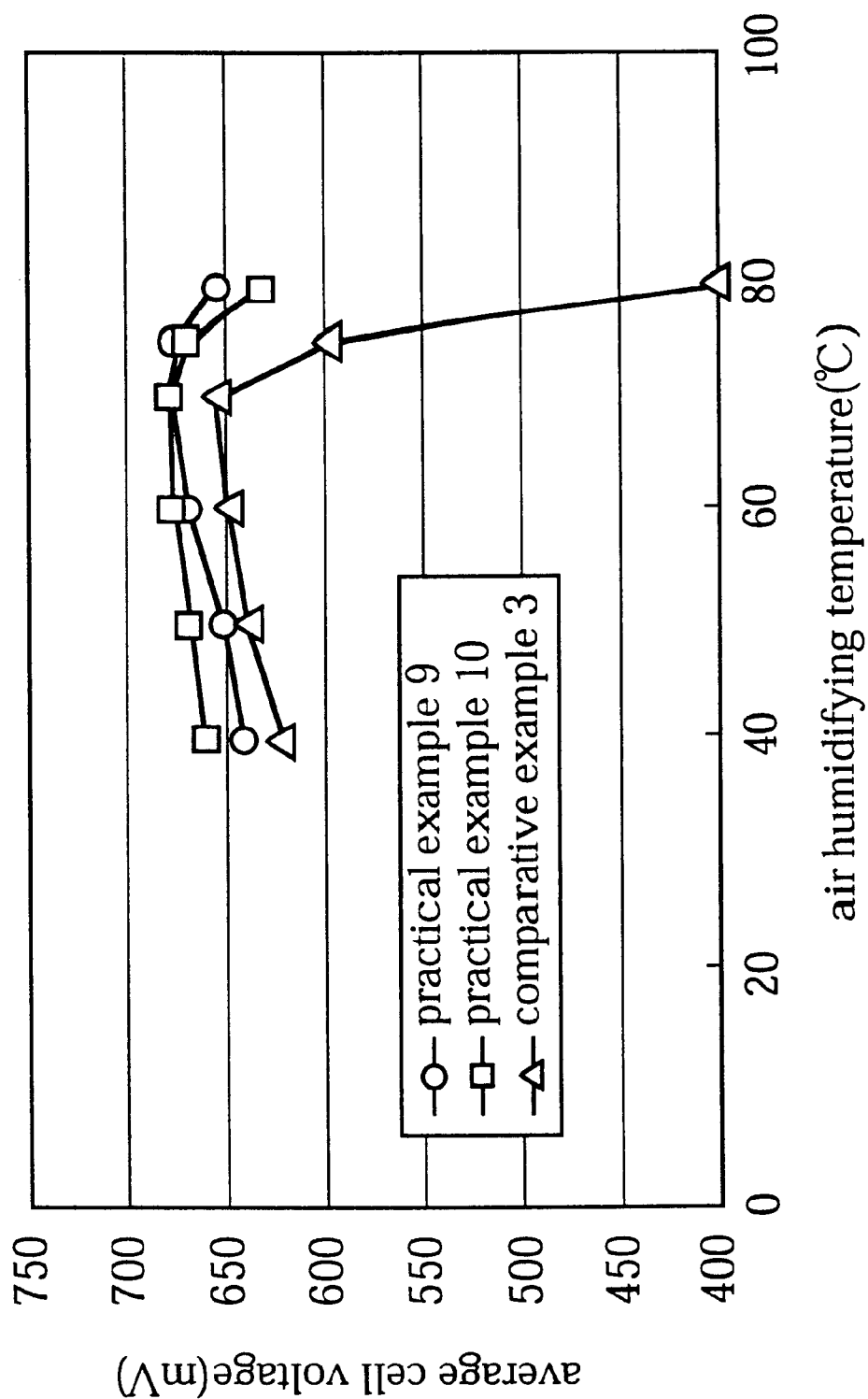
FIG. 11 is a plot showing a result of a cell performance comparative experiment in the third embodiment.
Figure 12A:
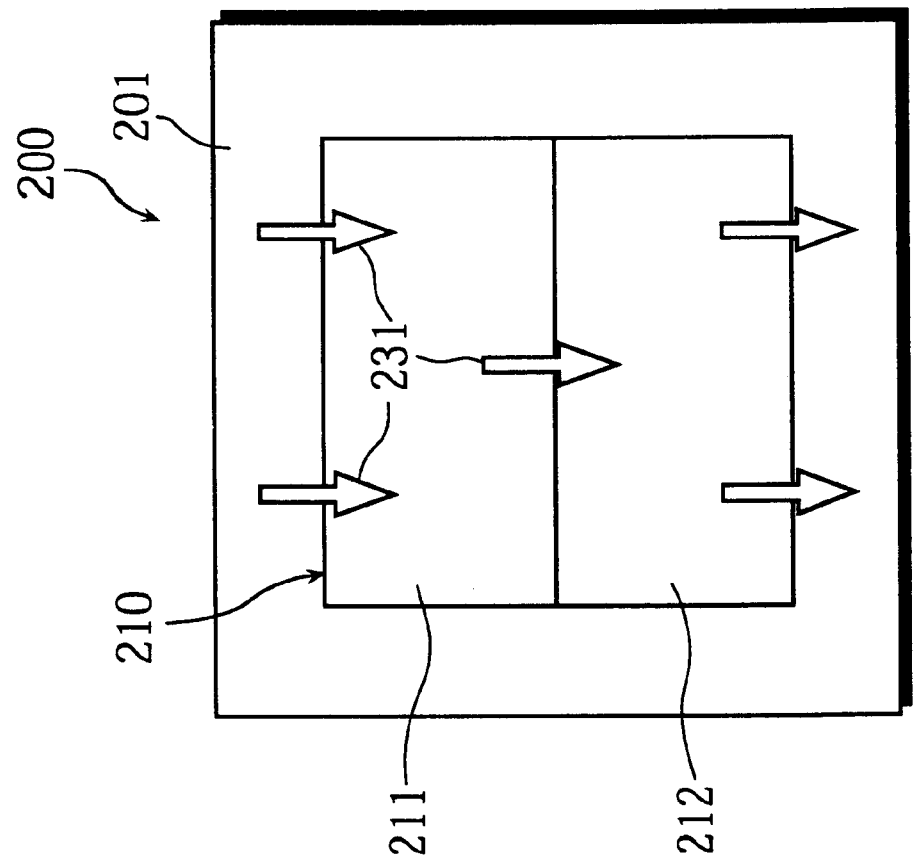
FIG. 12A shows a conventional fuel cell.
Figure 12B:
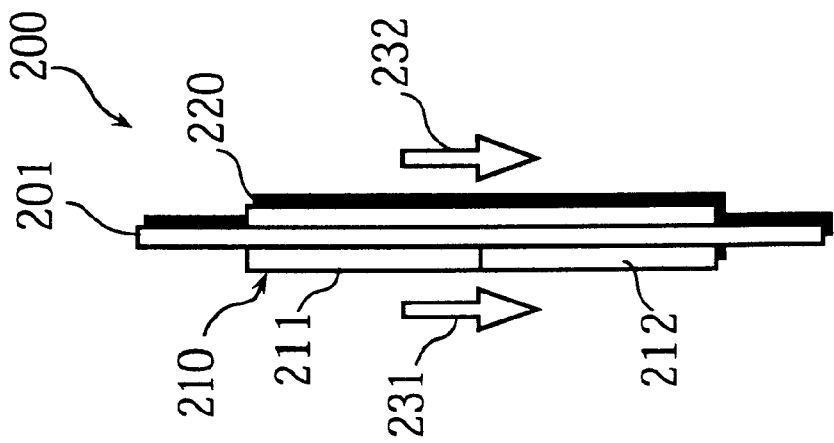
FIG. 12B is a side view of the conventional fuel cell shown in FIG. 12A.

FIGS. 10 and 11 are plots showing the experiment results. In FIG. 10, the vertical axis indicates the average cell voltage (mV) and the horizontal axis indicates the current density (Amp/cm²). In FIG. 11, the vertical axis indicates the average cell voltage (mV) and the horizontal axis indicates the humidifying temperature of air (° C.).

Consideration:

FIG. 10 shows that favorable output can be obtained for each of the practical examples 9 and 10 compared with the comparative example 3 on the same conditions.

FIG. 11 shows that output slightly changes as the humidifying temperature of the oxidizer gas changes for each of the practical examples 9 and 10. On the other hand, for the comparative example 3, the output drastically drops when the humidifying temperature is increased to raise the humidity.

As shown in FIGS. 10 and 11, favorable output can be obtained for the practical examples 9 and 10 compared with the comparative example 3 for the reasons below.

(1) Appropriate amount of water is kept in the mixture layer 113, so that the solid polymer membrane 101 is kept moist with stability.

(2) A more amount of water-repellent material is included at the entrance for air than at the exit in the mixture layer 113, so that the water permeability of the layer 115, which covers the cathode catalyst layer 111, is adjusted so as to be lower at the entrance for air than at the exit. As a result, the amount of permeating water is set even at the entrance and exit for air to moist the solid polymer membrane 101 evenly.

For these reasons, the ion conductivity of the solid polymer membrane can be favorable and the internal resistance in the cell can be low.

Compared with the practical example 9, the practical example 10 shows slightly favorable cell voltage output.

For the practical example 10, the gas diffusion layer 112 is adjusted so that the water permeability is higher at the entrance for air than at the exit. As a result, the water in the mixture layer 113 can relatively easily disperses to prevent water from overly staying at the entrance for air.

Other Possible Modifications

In the embodiments, the layer to adjust the water permeability (the gas diffusion layer or the mixture layer) is divided into two parts, i.e., the water permeation suppressing part closer to the entrance for oxidizer gas and the water permeable part closer to the exit. The layer can be divided into more than two parts and the water permeability in the three parts can be set to change in stages. Also the water permeability can be set to continuously change from the entrance to the exit, so that the fluororesin content continuously decreases from the entrance to the exit.

In the embodiments, the gas diffusion layer or the mixture layer includes the water permeation suppressing part in an area extending from one end of the gas diffusion layer or the mixture layer on the side of the entrance for oxidizer gas so that the water permeability in this area is lower than the area closer to the exit. The water permeation suppressing part has the same effects even if positioned in an area slightly apart from the end of the gas diffusion layer or the mixture layer only when positioning close to the entrance for oxidizer gas.

While general polymer electrolyte fuel cell is taken as the example in the embodiments, the present invention is applicable to the direct methanol fuel cell (DMFC), in which methanol is directly supplied to the anode instead of fuel gas.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A fuel cell, comprising:
   (A) a cell that includes a cathode catalyst layer, an anode catalyst layer, and a solid polymer membrane, the solid polymer membrane being sandwiched between the cathode catalyst layer and the anode catalyst layer;
   (B) a first plate with fuel channels;
   (C) a second plate with oxidizer channels, the first and second plates sandwiching the cell, wherein
   the fuel channels face the anode catalyst layer, fuel passing through the fuel channels, and
   the oxidizer channels face the cathode catalyst layer, oxidizer passing through the oxidizer channels; and
   (D) a water permeability adjusting layer that is disposed on the cathode catalyst layer so as to face the oxidizer channels, the water permeability adjusting layer being conductive and gas-permeable, and having a water permeability that changes along a length of the water permeability layer, wherein the lenght is defined as extending from a first area on a side of an entrance for the oxidizer to a second area on a side of an entrance for the oxidizer to a second area on a side of the exit for the oxidizer.

2. The fuel cell according to claim 1, wherein the water permeability adjusting layer is formed by a conductive, porous material that has been processed so that water permeability of the conductive, porous material is lower in a first area starting from an end of the water permeability adjusting layer on a side of the entrance for the oxidizer than in a remaining area.

3. The fuel cell according to claim 2, wherein a percentage of the first area starting from the end of the water permeability adjusting layer on the side of the entrance for the oxidizer to an entire area of the water permeability adjusting layer is 10 to 90.

4. The fuel cell according to claim 1, wherein
   the water permeability adjusting layer is formed of a conductive, porous material that includes a water repellent, and
   a content of the water repellent in the area closer to the entrance for the oxidizer is set to be higher than a content of the water repellent in the area closer to the exit for the oxidizer.

5. The fuel cell according to claim 4, wherein a content of the water repellent in the water permeability adjusting layer on a side of the entrance for the oxidizer is 1.05 to 2.00 times a content of the water repellent in the water permeability adjusting layer on a side of the exit for the oxidizer.

6. The fuel cell according to claim 4, wherein the content of the water repellent to a weight of the water permeability adjusting layer in the area closer to the entrance for the oxidizer is 15 to 90 wt %.

7. The fuel cell according to claim 4, wherein the water repellent is fluororesin.

8. The fuel cell according to claim 1, wherein the water permeability adjusting layer includes:
   a gas diffusion layer that is formed of a water-repellent, conductive, porous material; and
   a mixture layer that is disposed between the gas diffusion layer and the cathode catalyst layer, the mixture layer being formed of a carbon material to which a water-repellent material has been added, and
   a specific surface area of a first carbon material in the area closer to the entrance for the oxidizer is smaller than a specific surface area of a second carbon material in the area closer to the exit for the oxidizer.

9. The fuel cell according to claim 8, wherein the water-repellent material has been added to the carbon material so that water repellency of the mixture layer is higher in the area closer to the entrance for the oxidizer than in the area closer to the exit for the oxidizer.

10. The fuel cell according to claim 8, wherein
    the cathode catalyst layer is formed by a carbon catalyst support that supports catalyst, and
    the specific surface area of the first carbon material is smaller than a specific surface area of a carbon catalyst support in the area closer to the entrance for the oxidizer.

11. The fuel cell according to claim 8, wherein the cathode catalyst layer is formed by a carbon catalyst support that supports catalyst, and the specific surface area of the second carbon material is larger than a specific surface area of a carbon catalyst support in the area closer to the exit for the oxidizer.

12. The fuel cell according to claim 1, wherein the water permeability adjusting layer includes:

a gas diffusion layer that is formed of a water-repellent, conductive, porous material; and a mixture layer that is disposed between the gas diffusion layer and the cathode catalyst layer, the mixture layer being formed of a carbon material to which a water-repellent material has been added, and the water-repellent material has been added to the carbon material so that water repellency of the mixture layer is higher in the area closer to the entrance for the oxidizer than in the area closer to the exit for the oxidizer.

13. The fuel cell according to claim 12, wherein a content of the water-repellent material with respect to a weight of the mixture layer is no greater than 60 w % in an area where the content of the water-repellent material is highest.

14. The fuel cell according to claim 12, wherein a water repellency of the gas diffusion layer is set to be lower in the area closer to the entrance for the oxidizer than in the area closer to the exit for the oxidizer.

15. The fuel cell according to claim 14, wherein the water-repellent, conductive, porous material is a conductive, porous material including a water-repellent material, and a content of the water-repellent material with respect to a weight of the gas diffusion layer is no greater than 60 w % in an area where the content of the water-repellent material is highest.

16. The fuel cell according to claim 1, a plurality of the fuel cells being stacked in layers to form a fuel cell stack, the fuel cell stack being provided with channels for coolant between the plurality of the fuel cells, wherein the coolant and the oxidizer travel in the same direction.

* * * * *